US006827034B1

(12) United States Patent
Paulo (10) Patent No.: US 6,827,034 B1
(45) Date of Patent: Dec. 7, 2004

(54) ILLUMINATED DIAL AND POINTER DISPLAY

(75) Inventor: Sergio Alexandre Paulo, Kingsville (CA)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/254,737

(22) Filed: Sep. 25, 2002

(51) Int. Cl.⁷ .............................................. G01D 11/28
(52) U.S. Cl. ..................... 116/286; 116/287; 116/288; 116/DIG. 36; 116/62.1
(58) Field of Search ................................ 116/286, 62.1, 116/287, 208, 290, 292, 293, 294, 299, 284, 300, 301, DIG. 36

(56) References Cited

U.S. PATENT DOCUMENTS

| | | | |
|---|---|---|---|
| 2,417,339 A | * 3/1947 | Woolley | 346/17 |
| 2,915,874 A | * 12/1959 | Ferguson, Jr. | 368/230 |
| 3,476,075 A | * 11/1969 | Raby | 116/62.3 |
| 3,776,176 A | * 12/1973 | Doyle | 116/288 |
| 3,853,089 A | * 12/1974 | Howard | 33/348 |
| 3,901,217 A | * 8/1975 | Clark | 600/490 |
| 4,016,827 A | 4/1977 | Lawrence | |
| 4,195,518 A | * 4/1980 | Fees | 73/861.57 |
| 4,723,232 A | 2/1988 | Beebe | |
| 4,878,453 A | * 11/1989 | Inoue et al. | 116/288 |
| 4,970,400 A | * 11/1990 | Muramatsu | 250/463.1 |
| 5,044,304 A | * 9/1991 | Tomita | 116/286 |
| 5,295,049 A | 3/1994 | Terada | |
| 5,590,945 A | * 1/1997 | Simms | 362/31 |
| 5,949,346 A | * 9/1999 | Suzuki et al. | 340/815.45 |
| 6,044,790 A | * 4/2000 | Murakami | 116/28.1 |
| 6,269,563 B1 | 8/2001 | Dagan | |
| 6,324,463 B1 | * 11/2001 | Patel | 701/93 |
| 6,408,784 B1 | * 6/2002 | Ross | 116/288 |
| 6,443,582 B1 | * 9/2002 | Tarne et al. | 362/27 |
| 6,470,822 B2 | * 10/2002 | Adams et al. | 116/284 |
| 6,561,123 B2 | * 5/2003 | Kallinke et al. | 116/288 |

FOREIGN PATENT DOCUMENTS

JP        55-144551        11/1980

* cited by examiner

Primary Examiner—Diego Gutierrez
Assistant Examiner—Tania Courson
(74) Attorney, Agent, or Firm—Rader, Fishman & Grauer PLLC

(57) ABSTRACT

An illuminated dial and pointer assembly wherein a movable pointer is illuminated with a tracking external directed light source as the pointer moves relative to a display dial. A plurality of systems are disclosed for moving said pointer and illuminating said pointer with a directed light source, including a system wherein magnetic attraction allows the pointer to track a motorized light source.

13 Claims, 9 Drawing Sheets

ILLUMINATED DIAL AND POINTER DISPLAY

FIELD OF THE INVENTION

The present invention relates to a dial and pointer assembly for displaying a measurement of a property, characteristic or condition, for example, a speedometer for indicating the speed of a vehicle.

BACKGROUND OF THE INVENTION

Figure 1:
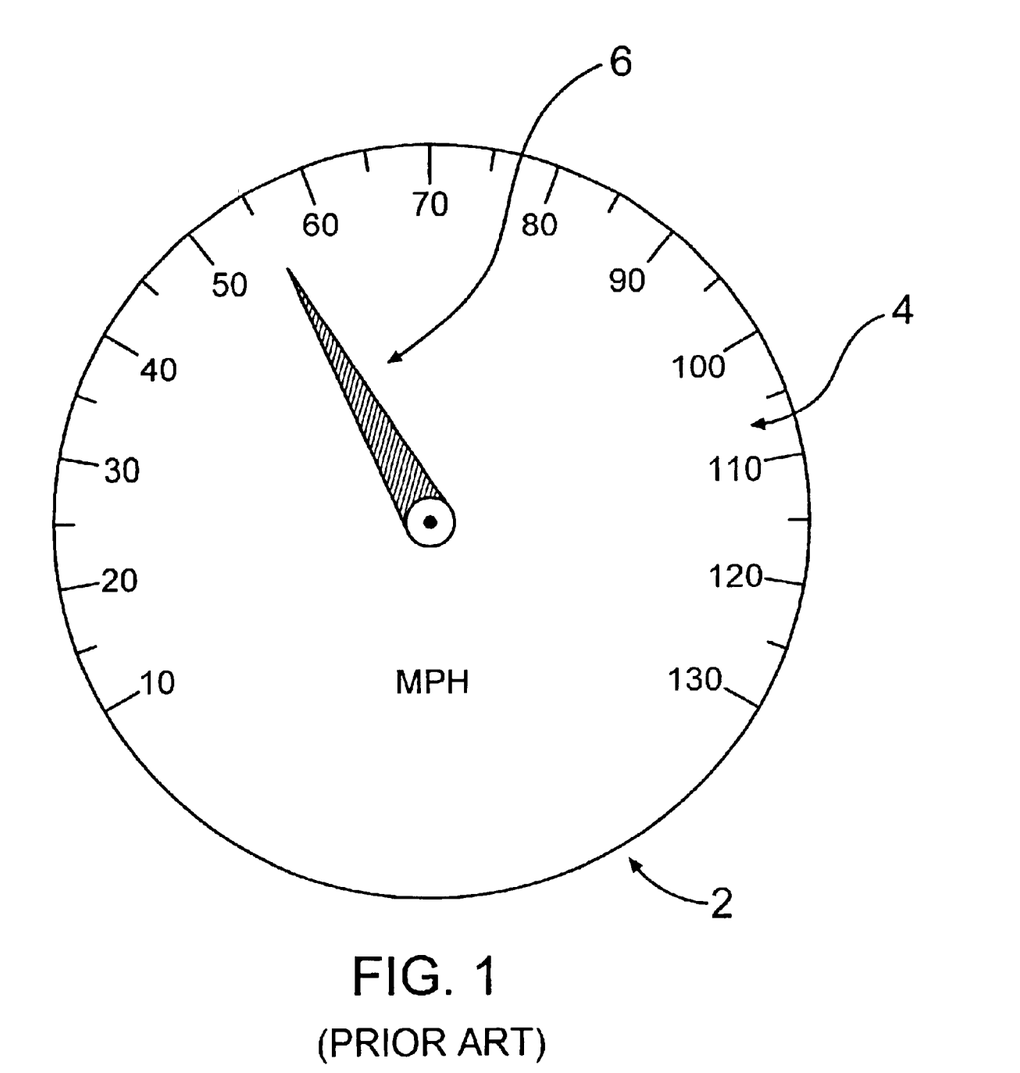
FIG. 1 illustrates a prior art dial-type display.

The use of a dial-type display for indicating a measured property, characteristic or condition is common among many of today's industries. For example, a dial and pointer display is frequently used in a vehicle as a speedometer. FIG. 1 depicts a typical vehicle speedometer 2, which includes a dial 4 and a pointer 6. Dial 4 is marked with gradations corresponding to an increasing value of a property, such as a vehicle's speed in miles per hour. In response to a measurement of the vehicle's speed, pointer 6 rotates either clockwise or counterclockwise so that the tip of pointer 6 points to the appropriate value on the dial that corresponds to the measured speed of the vehicle.

Typical pointer and dial displays are not inherently illuminated. They require a separate light source to illuminate the display, thereby making it visible in dark environments, such as at night. One common way to illuminate a pointer is to locate a light source inside of a translucent pointer, thereby making the pointer glow. However, this method simply illuminates the pointer, not the dial. To illuminate the dial, it is known to mount one or more fixed light sources either around the dial, thereby illuminating the entire dial directly, or alternatively, behind the dial in order to illuminate the entire dial through backlight.

SUMMARY OF THE INVENTION

The present invention relates to an illuminated dial display comprising a dial and a pointer. One or more light sources, which is/are separate and external from the pointer, illuminates the pointer itself and a region of the dial around the pointer, leaving the remaining portion of the dial dark.

DETAILED DESCRIPTION OF AN EMBODIMENT

Figure 2:
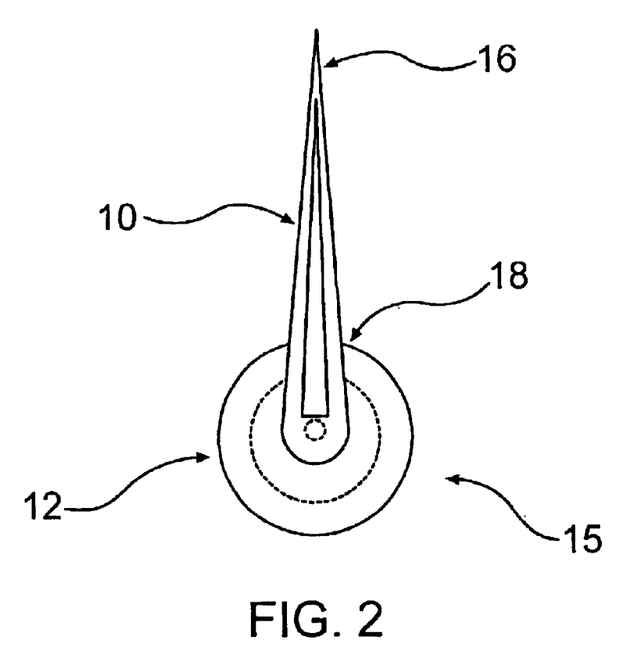
FIG. 2 is a simplified illustration of a top view of a pointer unit for a display device.
Figure 3:
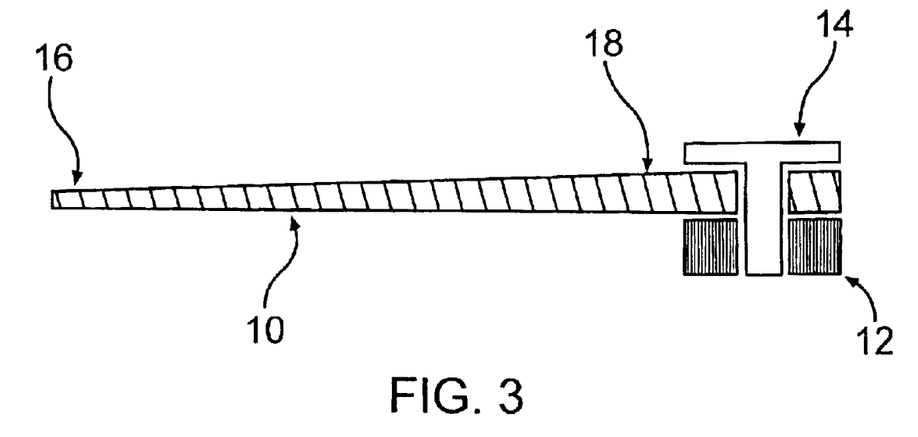
FIG. 3 is a simplified illustration of a side view of the pointer unit of FIG. 2.

FIGS. 2 and 3 depict a close-up view of a pointer unit 15 that can be used for a dial-type display according to various embodiments of the present invention. The pointer unit 15 is comprised of a pointer 10 mounted to a pointer base 12 and to a pointer cover 14 in such a manner that pointer 10 can rotate around an axis of the pointer base 12. According to one embodiment of the invention, the pointer unit 15 can be incorporated with a dial display (not shown in FIGS. 2 and 3) by attaching the pointer base 12 to the surface of the display. Alternatively, the pointer 10 can be mounted upon a drive shaft (not shown in FIGS. 2 and 3) projecting out from the display, as will be illustrated later in accordance with another embodiment of the invention.

The pointer 10 can be made from a variety of suitable materials. For example, pointer 10 can be made from a solid substrate and then covered with a reflective material, thus making pointer 10 highly visible when light is shining upon it. Alternatively, pointer 10 can be comprised of a naturally reflective or semi-reflective material such as acrylic. The visibility of pointer 10 can be further enhanced by scratching or etching the surface of the acrylic or other reflective material, thereby causing light to reflect off of the pointer 10 in a variety of directions. Another option is to make pointer 10 from a transparent or translucent material that allows light provided by a light source to travel through it, thereby causing pointer 10 to glow. This glowing effect can be further enhanced by incorporating a hole that opens at the surface of pointer 10 and which extends down through at least a portion of pointer 10. For example, a hole that opens at the tip end of pointer 10 allows light to travel down through the pointer. The light becomes "trapped" and must travel through the transparent or translucent pointer 10, thereby enhancing the glowing effect.

In certain embodiments of the invention, the pointer 10 is magnetized such that it has, for example, a magnetic north pole 16 near the distal tip of the pointer and a magnetic south pole 18 closer to the base of the pointer 10. The pointer 10 may be magnetized according to a variety of techniques, including, for example, (i) at least partially constructing the pointer 10 from magnetic materials, or (ii) inserting a magnet in or mounting a magnet to pointer 10.

Figure 4:
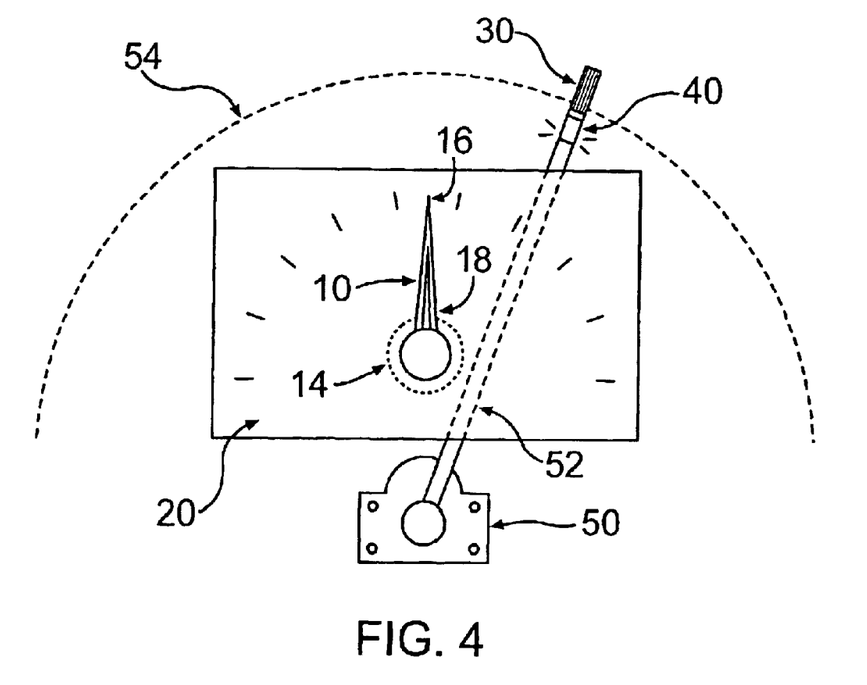
FIG. 4 is a simplified illustration of a top view of an illuminated dial display according to a first embodiment of the present invention.
Figure 5:
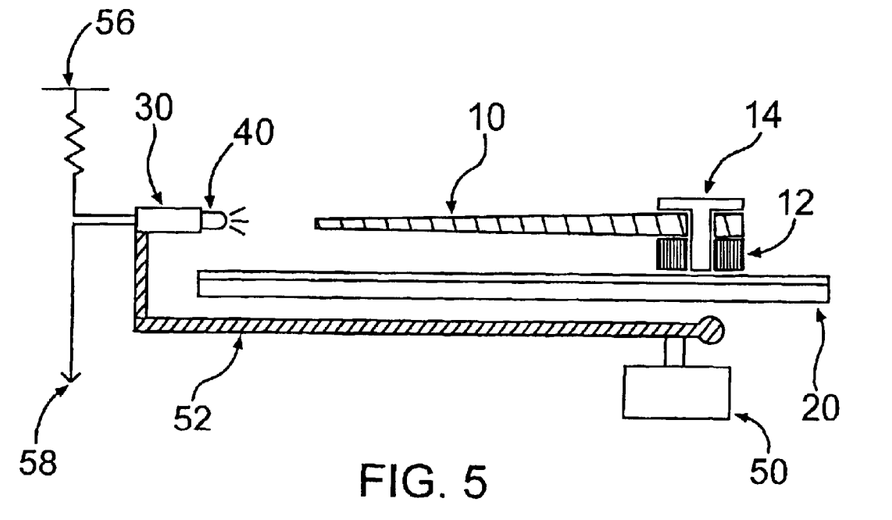
FIG. 5 is a simplified illustration of a side view of the illuminated dial display of FIG. 4.

FIGS. 4 and 5 depict an illuminated pointer and dial display according to a first embodiment of the invention. FIG. 4 illustrates a top view of the embodiment, and FIG. 5 illustrates a side view of the same embodiment, with like elements having like reference numerals. A pointer unit having a pointer 10 with a magnetic north pole 16 and magnetic south pole 18, as previously depicted in FIGS. 2 and 3, is mounted to a display dial 20. The display dial 20 may have gradations relating to virtually any type of measured characteristic, such as, for example, vehicle speed. Pointer 10 is not attached to any drive mechanism, so it rotates freely about its connection point.

A drive motor 50 is mounted behind or under the display 20. A support arm 52 is coupled to drive motor 50. The support arm 52 extends underneath or behind display 20 and then projects up past an edge of the display 20, preferably in a manner that is not visible to a human observer (i.e., the driver). A magnet 30 is mounted to the distal end of support arm 52. The magnet 30 may, for example, comprise a permanent magnet, an electromagnet, or any other type of magnet. Regardless of the particular type of magnet employed, magnet 30 is arranged in relation to magnetic pointer 10 so that they present opposite poles to one another, thereby establishing a magnetic attraction between magnet 30 and pointer 10.

A light source is also mounted to the distal end of support arm 52. A variety of different light sources may be used, and a directional light source, i.e., one that provides a relatively narrow source of directional light, is preferred. For example, a light emitting diode (LED) is one acceptable type of light to utilize with the display. Connection terminals 56 and 58 are attached to light source 40. Connection terminals 56 and 58 are used to connect the light source 40 to a power source (not shown) and an electronic controller (not shown), respectively. Connections 56 and 58 will also be made to magnet 30 if it is an electromagnet.

The operation of the illuminated pointer and dial display according to the first embodiment will now be described with respect to FIGS. 4 and 5. In response to a control signal indicative of a measured characteristic (e.g., vehicle speed), drive motor 50 moves the coupled support arm 52 such that the distal end of support arm 52, to which are attached magnet 30 and light source 40, defines a circular shaped path 54 around the display 20. Support arm 52 is moved in a controlled manner, allowing magnet 30 and light source 40 to be positioned at any point along path 54.

Due to magnetic attraction between pointer 10 and magnet 30, pointer 10 rotates in coordination with magnet 30, tracking the motion of support arm 52. As a result, the movement of pointer 10 is synchronized with the movement of support arm 52. In this way, the pointer 10, which is indirectly responsive to the control signal indicative of the measured characteristic, provides a visible indication to an observer (e.g., a vehicle driver) relative to the dial 20 of a measured characteristic.

Light source 40 causes pointer 10 and an area of dial 20 around pointer 10 to be illuminated as pointer 10 moves relative to dial 20. As indicated above, the movement of pointer 10 and support arm 52 are synchronized due to magnetic attraction between the pointer 10 and magnet 30 mounted upon support arm 52. Consequently, the movement of light source 40 and rotation of pointer 10 are also synchronized, resulting in light source 40 always being lined up with pointer 10. As a result, light emitted from light source 40 is always directed upon pointer 10 and the nearby region of the dial display 20 surrounding pointer 10. This manner of illuminating pointer 10—i.e., using a separate and external light source 40 that moves in synchronization with the rotation of pointer 10—not only provides superior illumination of pointer 10, but it also creates a visually appealing penumbra of light upon the dial display 20 around pointer 10.

Figure 6:
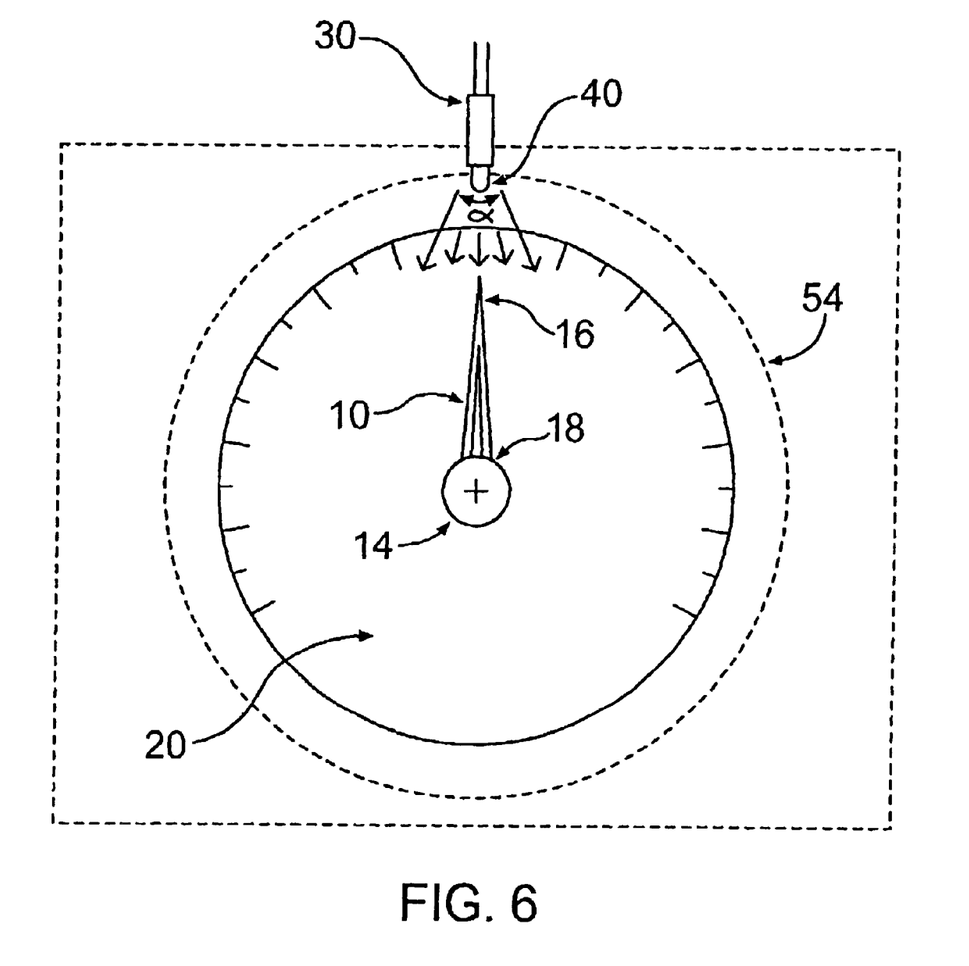
FIG. 6 is a simplified illustration of an illuminated dial display according to a first embodiment, emphasizing the angle of light distributed upon the dial.

The illumination of the pointer 10 and a surrounding portion of dial display 20 is illustrated in FIG. 6. Light source 40, which is in alignment with pointer 10, emits light at an angle of distribution α. Accordingly, only objects that fall within angle α of distributed light are illuminated. Due to the synchronous movement of pointer 10 and support arm 52, pointer 10 will always be roughly maintained within the center of angle α. As such, regardless of its location, pointer 10, along with the portion of dial display 20 around pointer 10, will always be illuminated.

Figure 7:
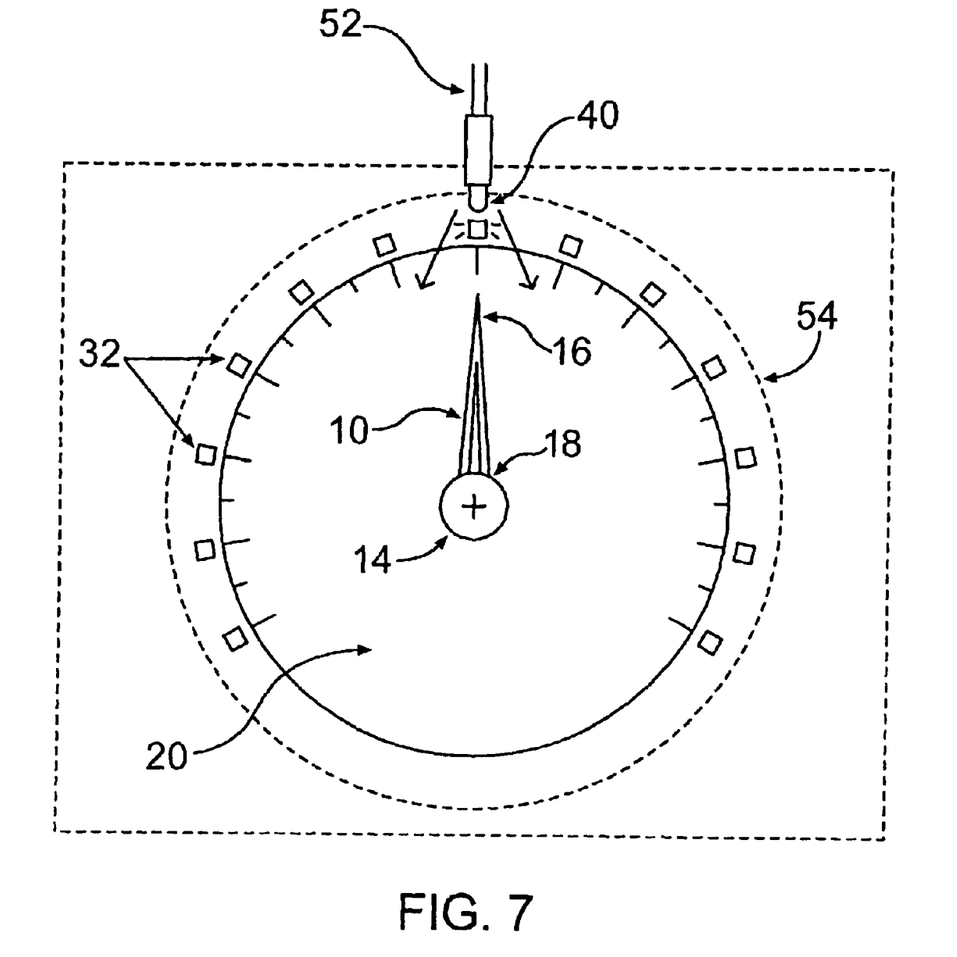
FIG. 7 is a simplified illustration of an illuminated dial display according to a second embodiment of the present invention.

FIG. 7 depicts an illuminated pointer and dial display according to a second embodiment of the present invention. Similar to the first described embodiment, a pointer unit, including a freely-rotating magnetic pointer 10, is secured to dial display 20. Also similar to the first embodiment, a drive motor (not shown in FIG. 7) causes a support arm 52 to move in such a manner that the distal end of support arm 52, which projects above the dial display 20, travels along circular path 54 around dial display 20. A light source 40 is mounted to the distal end of support arm 52.

Unlike the first embodiment of the invention, the distal end of support arm 52 does not include a magnet. Instead of controlling the rotation of pointer 10 with a single magnet, as in the previous embodiment, a plurality of electromagnets 32 are fixedly positioned around the dial display 20. In response to a control signal indicative of a measured property, characteristic or condition, an electronic controller (not shown) selectively activates electromagnets 32. The selective activation of electromagnets 32 controls the rotation and positioning of pointer 10 relative to the dial 20. For example, to rotate pointer 10 to a position that corresponds to the location of a particular electromagnet 32, that electromagnet 32 is activated while all the other electromagnets remain inactivated. To rotate pointer 10 to a position corresponding to a point in-between two neighboring electromagnets 32, those two neighboring electromagnets are both activated. The resultant magnetic attraction created between the two activated electromagnets 32 and pointer 10 causes pointer 10 to rotate to a position in-between the two activated electromagnets 32.

As in the first embodiment of the invention, external light source 40 is used to illuminate pointer 10 and a surrounding area of the display dial 20. To that end, the movement of support arm 52 is matched to the selective activation of electromagnets 32 such that the support arm 52 moves the light source 40 in alignment with the active electromagnet 32. In this particular embodiment, the support arm 52 is controlled by a drive motor, which is responsive to the same or equivalent control signal as that which controls the selective activation of the electromagnets 32. As a result, when a given electromagnet 32 is activated, the support arm 52 moves the light source 40 to the location of the given electromagnet 32. Further, due to the magnetic attraction between pointer 10 and the activated electromagnet 32, pointer 10 is rotated to the location of the activated electromagnet 32. In this way, the respective movements of the light source 40 and the pointer 10 remain synchronized. The coordination of the movement of support arm 52 with the selective activation of electromagnets 32 can be accomplished in a variety of ways, provided that the end result is that the movement of the light source 40 remained synchronized with the movement of the pointer 10. For example, the support arm 52 could be mounted such that it freely rotates, i.e., without a drive motor, and with a magnet mounted on its distal end near the light source 40. In this way, the selective activation of the electromagnets 32 would control the positioning of both the light source 40 and the pointer 10.

Figure 8:
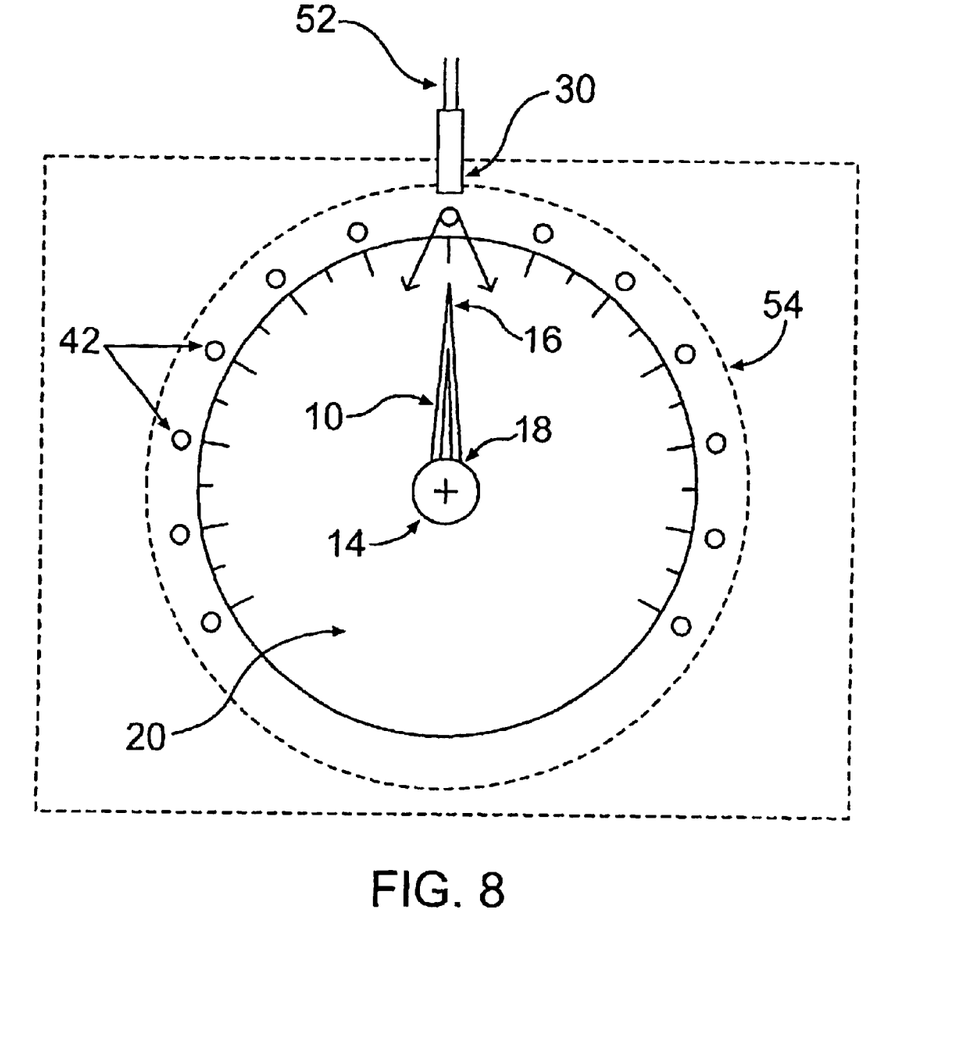
FIG. 8 is a simplified illustration of an illuminated dial display according to a third embodiment of the present invention.

FIG. 8 depicts an illuminated pointer and dial display according to a third embodiment of the present invention, with like elements from previously described embodiments having like reference numerals. According to this embodiment of the invention, light sources 42 are distributed around the display dial 20. A magnet 30 is mounted to the distal end of support arm 52. As in the first embodiment of the invention, rotation of pointer 10 is controlled by magnetic attraction between pointer 10 and magnet 30, and, as such, the rotation of pointer 10 is synchronized to the movement of support arm 52. Magnet 30 is rotated by support arm 52, which is controlled by a drive motor 50 (not shown in FIG.

8) in response to a control signal indicative of a measured property, characteristic or condition.

In contrast to the first embodiment of the invention, there is no light source mounted to the distal end of support arm 52. Rather, a plurality of light sources 42 are fixedly mounted to the dial 20. The light sources 42 are selectively illuminated in response to a control signal indicative of the position of support arm 52. For example, if the position of support arm 52, and thus pointer 10, roughly coincides with the position of one of the plurality of fixed light sources 42, then that one fixed light source is activated while the remaining plurality of fixed light sources 42 remain inactivated. If the position of support arm 52 coincides with a position lying in-between two neighboring light sources, then those two neighboring fixed light sources are activated while the remaining plurality of fixed light sources 42 remain inactivated. In either instance, pointer 10 and a portion of dial display 20 around pointer 10 will be illuminated, while the remainder of the dial display 20 is dark.

Figure 9:
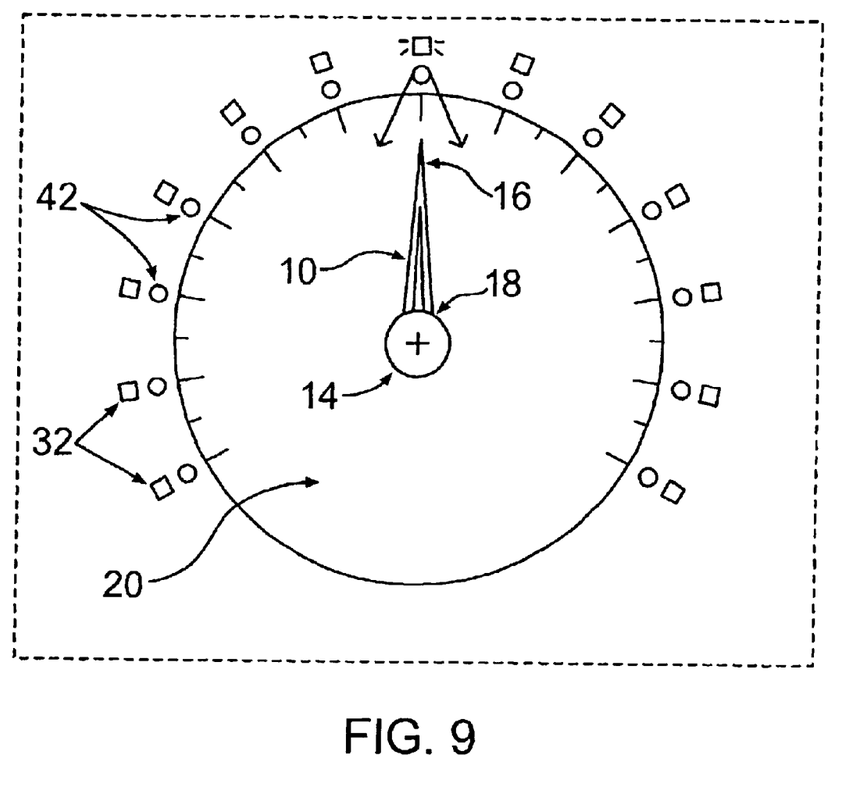
FIG. 9 is a simplified illustration of an illuminated dial display according to a fourth embodiment of the present invention.

FIG. 9 depicts an illuminated pointer and dial display according to a fourth embodiment of the present invention, wherein elements common to previously described embodiments have the same reference numeral. Similar to previously described embodiments, a pointer unit, including a freely rotating magnetic pointer 10, is mounted to dial display 20. Unlike previous embodiments, though, this embodiment of the invention does not include a drive motor 50 or support arm 52. Instead, a plurality of electromagnets 32 and a plurality of fixed light sources 42 are both positioned around the dial display 20. Though the number of fixed light sources 42 is shown to match the number of electromagnets 32 in FIG. 9, the number of fixed light sources may actually be less than or greater than the number of electromagnets 32. The greater the number of fixed lights 42 and electromagnets 32, within reason, the greater the precision with which the position of the pointer 10 and its illumination can be controlled.

Similar to the second embodiment, the electromagnets 32 of this embodiment are selectively activated, either individually or in neighboring pairs, according to a measured property, characteristic or condition that the dial display device is monitoring. Due to magnetic attraction, pointer 10 rotates to coincide with the position of either the one active electromagnet, or alternatively, to coincide with a position in-between the two active, neighboring electromagnets. To illuminate pointer 10, at least one of the fixed light sources 42 closest to the active electromagnet(s) 32, and thus closest to the pointer 10, are activated. For example, in the embodiment specifically depicted in FIG. 9, if only one electromagnet 32 is activated, then the individual fixed light source 42 corresponding to or nearest the active electromagnet 32 is similarly activated. If two neighboring electromagnets 32 are activated, then the two closest neighboring fixed light sources 42 are activated. In this manner, both pointer 10 itself and a portion of dial display 20 around pointer 10 is illuminated.

Figure 10:
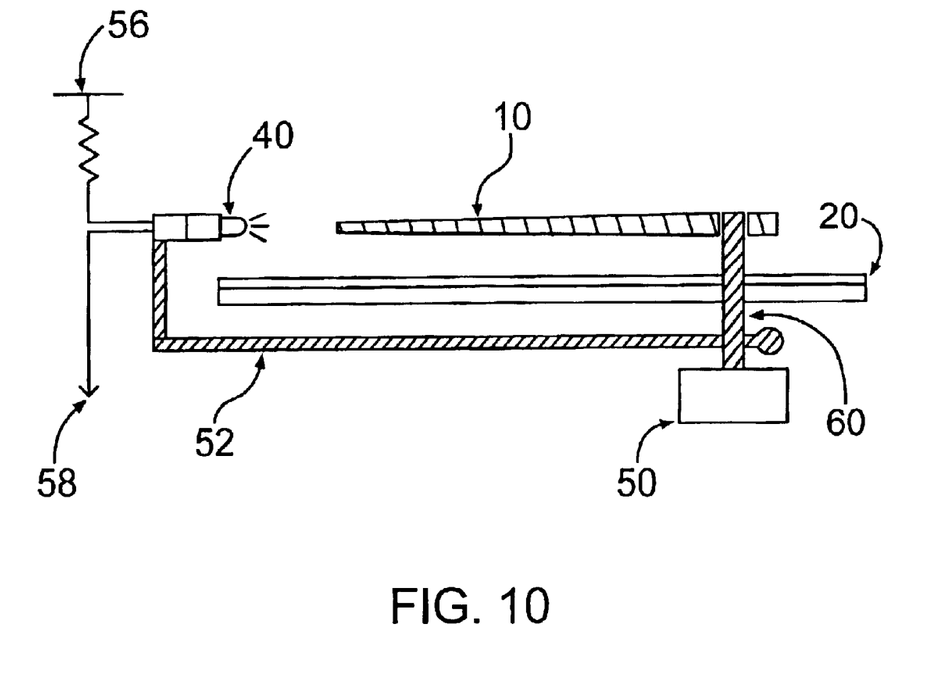
FIG. 10 is a simplified illustration of a side view of an illuminated dial display according to a fifth embodiment of the present invention.

FIG. 10 illustrates a side view of an illuminated pointer and dial display according to a fifth embodiment of the present invention, wherein elements common to previously-described embodiments have like reference numerals. According to this embodiment, pointer 10 does not have magnetic qualities, and magnetic attraction is not used to rotate pointer 10. A drive motor 50, as used in previous embodiments, connects to and moves support arm 52. Additionally, the shaft 60 of drive motor 50 extends outward, passing through an opening in dial display 20 and connecting to pointer 10. Accordingly, rotation of pointer 10 is directly controlled by drive motor 50.

As both are directly connected to and controlled by drive motor 50, the movement of support arm 52 and rotation of pointer 10 are synchronized. As a result, light source 40 mounted at the distal end of support arm 52 will always be lined up with pointer 10, assuring that pointer 10 and a surrounding portion of dial display 20 are illuminated.

Figure 11:
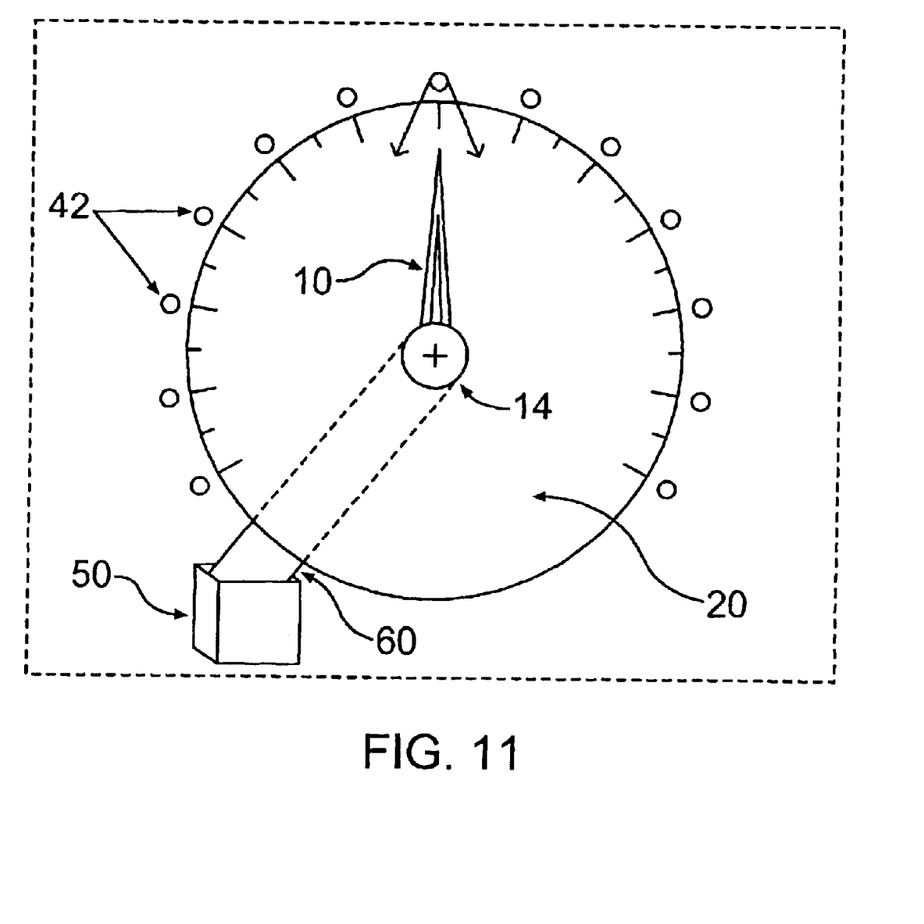
FIG. 11 is a simplified illustration of a top view of the illuminated dial display of FIG. 10.

FIG. 11 depicts a front view of an illuminated pointer and dial display according to a sixth embodiment of the present invention, wherein like elements described in previous embodiments have like reference numerals. Similar to the fifth embodiments of the invention, the rotation of pointer 10 is directly controlled by drive motor 50 through shaft 60. However, unlike the fifth embodiment, no support arm is present. Instead, a plurality of fixed light sources 42 is positioned around the dial display 20. Depending on the number of fixed light sources 42 employed and the area of the dial 20 adequately lit by each individual light source, one or more fixed light sources 42 closest to the dial region occupied by pointer 10 are selectively activated, thereby illuminating pointer 10 and a surrounding portion of display dial 20.

While the invention has been specifically described in connection with certain specific embodiments thereof, it is to be understood that this is by way of illustration and not of limitation, and the scope of the appended claims should be construed as broadly as the prior art will permit.

What is claimed is:

1. An illuminated dial pointer assembly, comprising:

a dial display;

a pointer movably mounted proximate to said dial display, said pointer having a base and a distal tip, said tip being configured to indicate a characteristic on said dial display;

means for moving said pointer relative to said dial display;

a movable external light source configured to move in coordination with said pointer; and said moveable external light source illuminating said pointer as said pointer moves relative to said dial display, said moveable external light source being physically detached from said pointer and positioned proximate said distal tip of said pointer.

2. The assembly of claim 1, wherein:

said pointer is magnetized; and further comprising a movable magnet positioned external to said pointer, said movable magnet being configured to magnetically attract said pointer.

3. The assembly of claim 2, wherein said movable magnet moves in response to a control signal indicative of a measured characteristic.

4. The assembly of claim 1, further comprising a motor and a movable arm controlled by said motor, said external light source being affixed on said arm, said motor being responsive to a control signal indicative of a measured characteristic.

5. The assembly of claim 1, wherein said external light source comprises one or more light emitting diodes.

6. The assembly of claim 1, wherein said pointer includes a light-capturing channel disposed therein.

7. An illuminated dial assembly, comprising:

a dial display;

a magnetized pointer movably mounted proximate to said dial display, said pointer having a base end and a distal tip, said distal tip being configure to indicate a characteristic on said dial display;

a movable magnet coupled to a drive motor, said movable magnet configured to attract said magnetized pointer; and one or more movable directed light sources physically detached from said pointer and positioned proximate to said distal end of said pointer, said one or more movable directed light sources being configured to track said movement of said pointer and illuminate said pointer.

8. The assembly of claim 7, wherein said movable magnet is coupled to said drive motor that causes said movable magnet to move in response to a control signal indicative of a measured characteristic.

9. The assembly of claim 7, wherein said movable directed light source is mounted to an arm that is controlled by said drive motor.

10. The assembly of claim 9, wherein said movable magnet is coupled to said arm.

11. A method of illuminating a pointer, comprising:

moving the pointer relative to a display dial; and directing one or more light sources upon said pointer as said pointer moves relative to said dial by tracking the pointer with said movable light source as said pointer moves relative to said dial display, said one or more light sources being physically detached from said pointer.

12. The method of claim 11, wherein said moving step comprises magnetically attracting said pointer.

13. The method of claim 12, wherein said moving step comprises magnetically attracting said pointer to a magnet that moves relative to said dial display in response to a control signal indicative of a measured characteristic.

* * * * *

UNITED STATES PATENT AND TRADEMARK OFFICE
CERTIFICATE OF CORRECTION

PATENT NO. : 6,827,034 B1
DATED : December 7, 2004
INVENTOR(S) : Sergio A. Paulo It is certified that error appears in the above-identified patent and that said Letters Patent is hereby corrected as shown below:

Column 7,
Line 1, change "configure" to -- configured --
Line 8, delete "end" and insert -- tip --

Signed and Sealed this

Twenty-fourth Day of May, 2005

JON W. DUDAS
*Director of the United States Patent and Trademark Office*